UNITED STATES PATENT OFFICE.

SAMUEL J. WHITING, OF PHILADELPHIA, PENNSYLVANIA.

IMPROVEMENT IN COMPOSITIONS FOR PAVEMENTS.

Specification forming part of Letters Patent No. 142,601, dated September 9, 1873; application filed August 20, 1873.

*To all whom it may concern:*

Be it known that I, SAMUEL J. WHITING, of the city and county of Philadelphia and State of Pennsylvania, have invented a new and useful Composition for Artificial Pavements, Roofing, &c.; and I do hereby declare the following to be a clear and exact description of the nature thereof, sufficient to enable others skilled in the art to which my invention appertains to fully understand, use, and make the same.

The composition consists of the following ingredients: Trinidad bitumen, twenty per cent.; balata gum, one per cent.; asphaltic oil, five per cent.; granulated shells or coral sand, forty per cent.; granulated granite, ten per cent.; pulverized carbonate of lime, fifteen per cent.; rosin, three per cent.; sand, six per cent.

The shells, granite, carbonate of lime, and sand are heated to deprive them of moisture and air, and then thoroughly incorporated with the combination of boiling bitumen, asphaltic oil, rosin, and balata gum. The bitumen combines with the shells, carbonate of lime, and granite. The balata gum tempers the concrete, permitting expansion and contraction due to heat and cold, and avoiding cracking. The asphaltic oil and rosin flux the entire mass during the operation of incorporation. The sand assists in giving body, and imparts roughness to the pavement.

The composition may be used for the following purposes: Sidewalks and streets, in mass or blocks; roofing, drain and water pipe, foundations of light-houses and other hydraulic works, coating for wire, railway-ties, pumps, wooden pipe, &c.

Having thus described my invention, what I claim as new, I desire to secure by Letters Patent, is—

The within-described composition, formed of the ingredients, in the manner, and of about the proportions set forth.

SAML. J. WHITING.

Witnesses:
JOHN A. WIEDERSHEIM,
A. E. LEHMAN.